US005825359A

United States Patent [19]

Derby et al.

[11] Patent Number: 5,825,359

[45] Date of Patent: Oct. 20, 1998

[54] METHOD AND SYSTEM FOR IMPROVED ARBITRATION OF A DISPLAY SCREEN IN A COMPUTER SYSTEM

[75] Inventors: Herbert G. Derby, Boulder Creek; Paul Charlton, Cupertino, both of Calif.

[73] Assignee: Apple Computer, Inc., Cupertino, Calif.

[21] Appl. No.: 539,671

[22] Filed: Oct. 5, 1995

[51] Int. Cl.[6] .................... G06F 7/00; G06F 3/14

[52] U.S. Cl. .................... 345/344; 345/342

[58] Field of Search .................... 395/327, 344, 395/345, 346, 342, 340, 356, 972; 345/119, 120, 342, 327, 344, 345, 346, 343, 340

[56] References Cited

U.S. PATENT DOCUMENTS

| | | | |
|---|---|---|---|
| 4,954,818 | 9/1990 | Nakane et al. | 345/120 |
| 5,129,055 | 7/1992 | Yamazaki et al. | 345/120 |
| 5,191,644 | 3/1993 | Takeda | 345/120 |
| 5,596,345 | 1/1997 | Goodfellow | 345/120 |
| 5,600,346 | 2/1997 | Kamata et al. | 345/120 |
| 5,615,326 | 3/1997 | Orton et al. | 395/356 |

*Primary Examiner*—Raymond J. Bayerl
*Assistant Examiner*—Cao H. Nguyen
*Attorney, Agent, or Firm*—Sawyer & Associates

[57] ABSTRACT

A method for arbitrating display output on a display device of a computer system comprises comparing a candidate display area with each rendering display area in a rendering collection and each waiting display area in a waiting collection, and determining whether at least one dependency exists for the candidate display area based on the comparing step, wherein the candidate display area is placed in the waiting queue when at least one dependency exists. The method further includes placing the candidate display area in the rendering collection when the at least one dependency does not exist. The method of arbitration includes releasing the current rendering display area. A method for scheduling display of data on a computer display device includes subdividing partitions of an output screen of the computer display device into display areas, determining whether at least one conflict exists between candidate display data, rendering display data in a rendering collection, and waiting display data in a waiting queue, and adding the candidate display data appropriately to either the rendering collection or the waiting queue based on at least one conflict existing.

29 Claims, 5 Drawing Sheets

METHOD AND SYSTEM FOR IMPROVED ARBITRATION OF A DISPLAY SCREEN IN A COMPUTER SYSTEM

FIELD OF THE INVENTION

The present invention relates to the field of scheduling outputs of displays on display screens, and more particularly to arbitrating display screens use among multiple rendering processes.

BACKGROUND OF THE INVENTION

With typical computer systems, users often run multiple programs or processes at the same time. The users can then usually switch from one process to another, such as switching from a graphics drawing program to a word processing program to a spreadsheet program on a routine basis. In a windowing computer environment especially, multiple processes each typically occupy separate, multiple windows, so that switching among programs merely involves switching from one window to another.

Control of display screen space by the multiple, simultaneously rendering programs remains a concern in these environments. Oftentimes, control of screen space occurs by sharing or allowing only one program to use the screen at a time. With these systems, a program cannot take control of the display screen until well-defined times when a previous program completes its use of the screen. In some systems, a preemptive approach is used to allow one program to interrupt and halt the use of the display screen by another program. In these preemptive systems, arbitration of the control of the display screen is a significant concern.

A usual approach to arbitrating use of screen space in a preemptive environment is the use of a client-server approach. In a client-server arrangement, one process acts as a "central" process whereby any other process must operate through that central process to output displays to the screen space. Unfortunately, using this client-server approach limits the processes' ability to write directly to the screen, thus limiting their ability to produce better, individual effects. Further, a high amount of overhead is required in this environment to perform the arbitration of screen use through the central process, and accordingly, latency time to output displays by the other processes is higher than desired.

Thus, what is needed is a method and system for efficient arbitration of display screen space that allows greater flexibility for multiple processes to write directly to the screen and that has lower overhead.

SUMMARY OF THE INVENTION

The present invention addresses these needs and provides methods and system aspects for improved arbitration of a display screen in a preemptive computer system environment.

In one aspect of the present invention, a method for arbitrating display output on a display device of a computer system comprises comparing a candidate display area with each rendering display area in a rendering collection and each waiting display area in a waiting queue, and determining whether at least one dependency exists for the candidate display area based on the comparing step, wherein the candidate display area is placed in the waiting queue when at least one dependency exists. The method further includes placing the candidate display area in the rendering collection when the at least one dependency does not exist.

Additionally, the determining step includes determining whether a first conflict exists between a current rendering display area and the candidate display area, incrementing a dependency count for the candidate display area when the first conflict exists, determining whether a second conflict exists between a current waiting display area and the candidate display area, and incrementing the dependency count for the candidate display area when the second conflict exists. The determining and incrementing steps are repeated for the candidate display area with each rendering display area in the rendering collection and each waiting display area in the waiting queue. Further, the determining step includes suspending the candidate display area when placed in the waiting queue.

In another aspect of the present invention, the method of arbitration includes releasing the current rendering display area, which includes determining whether a conflict exists between the current rendering display area and the current waiting display area, decrementing a dependency count for the current waiting display area when the conflict does exist, and determining whether the current waiting display area has a dependency count of zero, such that when the dependency count is zero, the current waiting display area is added to the rendering collection. When the current waiting display area does not have a dependency count of zero, the current waiting display area remains in the waiting queue. Further, when the current waiting display area is not the last waiting display area, the determining and decrementing steps are repeated with a next waiting display area in the waiting queue.

In one embodiment, a display area is a rectangle area. In a further embodiment, when the candidate display area is a movie, the movie has no dependencies. There are a variety of other embodiments within the spirit and scope of the present invention.

As a further aspect of the present invention, a method for scheduling display of data on a computer display device includes subdividing partitions of an output screen of the computer display device into display areas, determining whether at least one conflict exists between candidate display data, rendering display data in a rendering collection, and waiting display data in a waiting queue, and adding the candidate display data appropriately to either the rendering collection or the waiting queue based on at least one conflict existing.

In another aspect, the present invention includes a computer readable medium containing program instructions for comparing a candidate display area with each rendering display area in a rendering collection and each waiting display area in a waiting queue, and determining whether at least one dependency exists for the candidate display area based on the comparing step, wherein the candidate display area is placed in the waiting queue when at least one dependency exists.

With the present invention, an efficient manner of arbitrating screen space on a display device is achieved. Multiple processes can substantially simultaneously output data in separate partitions of the screen. The present invention takes to advantage partitioning structures typical of most computer systems in performing the arbitration. By this arbitration, a flexible scheduling approach is provided that has lower overhead requirements and reduced latency time in comparison to that of typical client-server scheduling systems. In addition, the flexibility of the present invention allows special types of display outputs, such as movies, to be properly arbitrated with other display outputs.

These and other advantages of the aspects of the present invention will be more fully understood in conjunction with the following detailed description and accompanying drawings.

DETAILED DESCRIPTION

The present invention relates to arbitration for control of display areas on a display screen by multiple processes rendering substantially simultaneously on a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
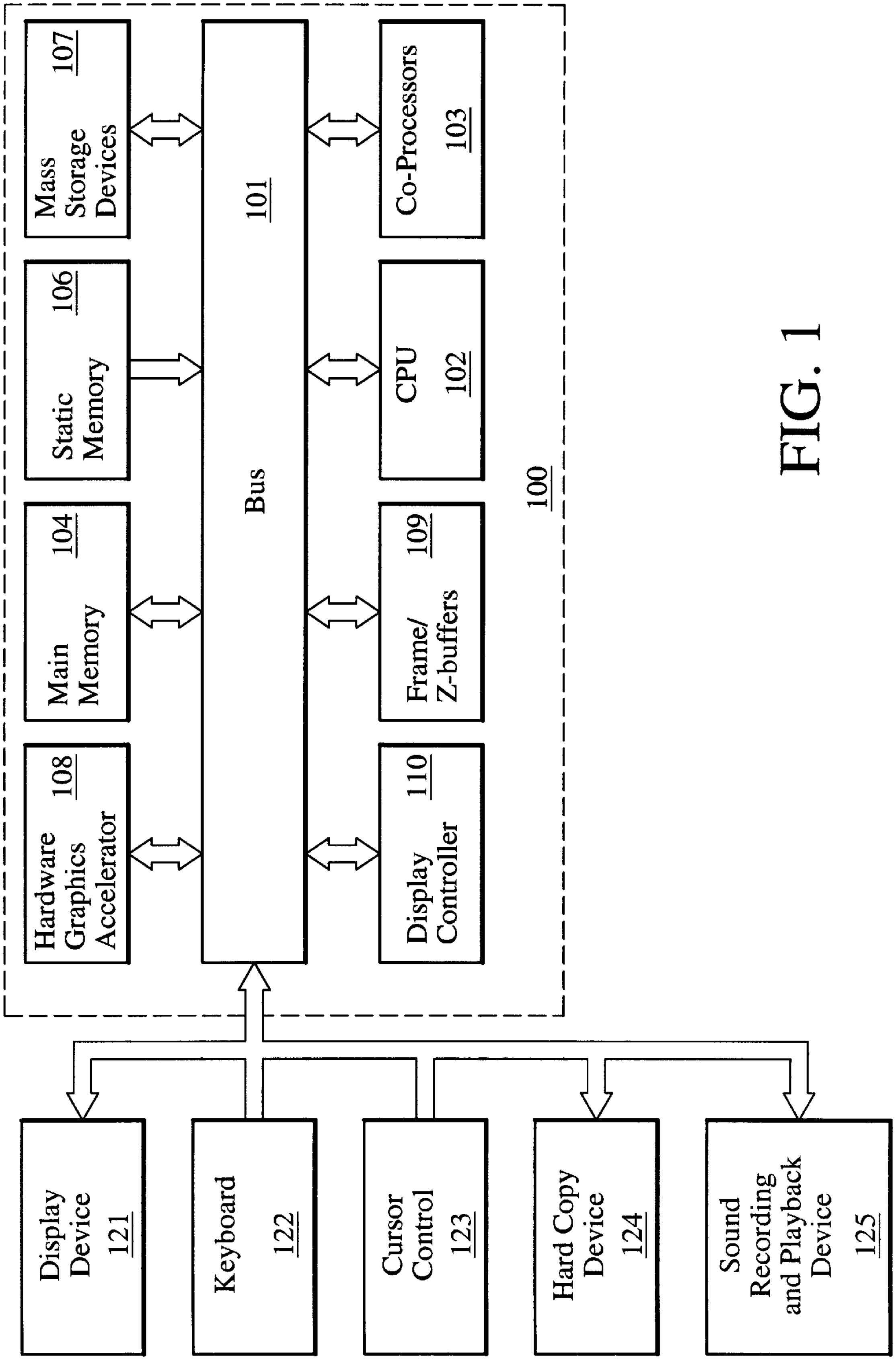
FIG. 1 illustrates a block diagram of a computer system in accordance with the present invention.

Referring to FIG. 1, a computer system 100 suitable for the present invention includes a bus 101 for internal transmission of digital data. A central processing unit (CPU) 102 is coupled to bus 101 and processes digital data information. A plurality of co-processors 103 are also optionally coupled to the bus 101 for additional processing power and speed.

Random access memory (RAM) or main memory 104 is also coupled to bus 101. Main memory 104 suitably stores information and instructions executed by CPU 102. Main memory 104 further stores temporary variables and other intermediate information during execution of instructions by CPU 102, as is well appreciated by those skilled in the art. Read only memory (ROM) or other form of static storage device 106 is also included and coupled to bus 101. ROM 106 preferably stores static information and instructions for CPU 102. Other storage devices 107, such as a hard disk drive, a floppy disk drive, etc., are also suitably included for storing information and instructions and are coupled to bus 101. Further included are hardware graphics accelerator 108, frame/Z-buffers 109, and display controller 110. Display controller 110 interfaces computer system 100 to a display device 121. An accelerator 108 receives signals from the CPU 102 and changes the information in the frame buffer 109.

A cathode ray tube (CRT) as display device 121 suitably displays information to a computer user. Further included for a user are an alphanumeric input device 122, such as a keyboard, and cursor control device 123 such as a mouse, joystick, trackball or touch pad, etc.

Figure 2:
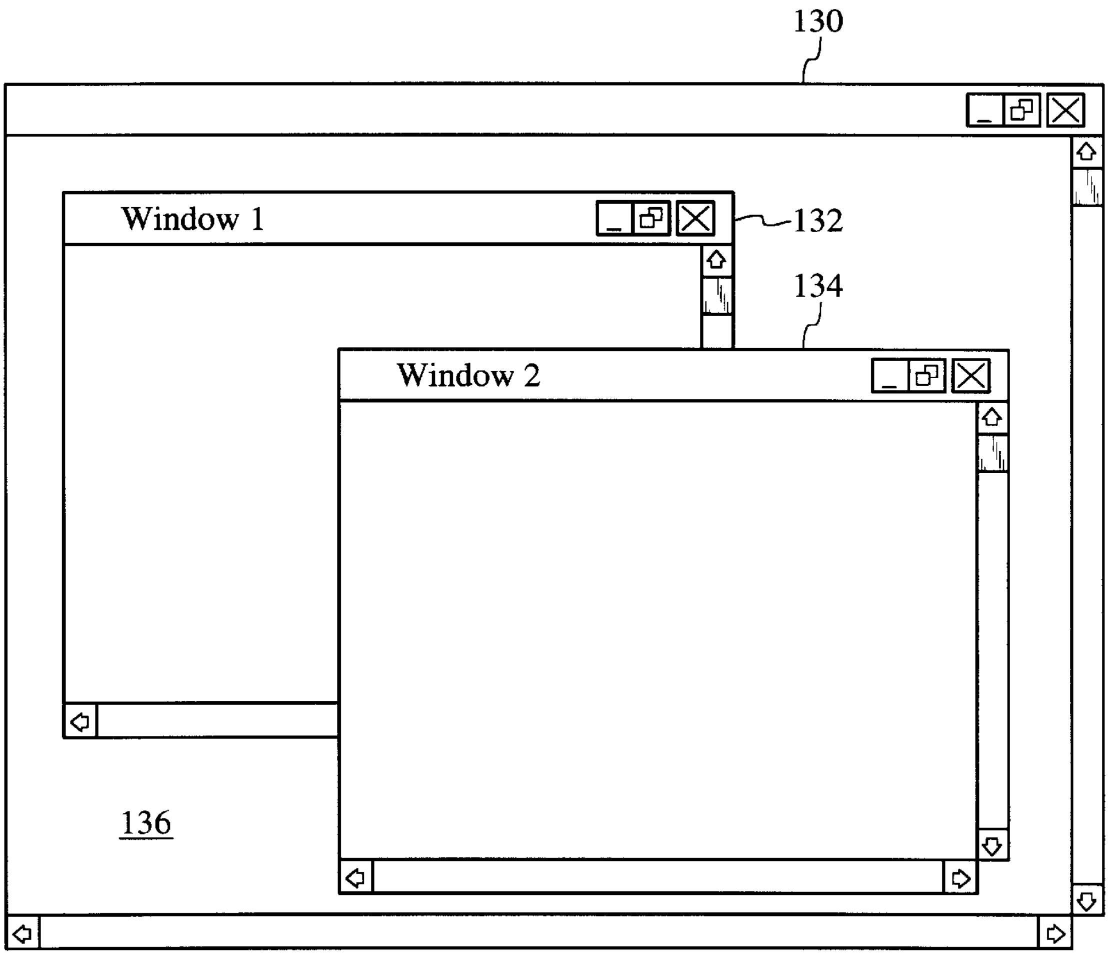
FIG. 2 illustrates a general diagram of a display screen with windows.

FIG. 2 illustrates a general diagram of a generic display output on display device 121 (FIG. 1). As shown, typically a display screen 130 capably outputs processes in windows, such as a first window 132 for a first process, and a second window 134 for a second process, over a background display 136. Usually, the structure of the frame buffer (such as frame buffer 109 of FIG. 1) for a display system in a windowing environment suitably provides a set of partitions of pixels for each window (e.g., windows 132 and 134) being displayed, as well as the background 136. With such a partitioned structure, display operations in one window are essentially guaranteed to not interfere with display operations in other windows. Thus, separate processes in separate windows can proceed substantially simultaneously without interfering with each other. The present invention takes to advantage the structure of partitioning to reduce the latency time and overhead in arbitrating the use of screen space for multiple processes to rendering at the same time.

In accordance with the arbitration of the present invention, in separate partitions, e.g., the first window 132 and the second window 134, separate processes can run at the same time. Further, a system in accordance with the present invention also arbitrates subdivisions of the partitions into smaller areas that allow multiple displays within each window. The displays that are output within each subdivision suitably run substantially simultaneously as long as the subdivisions do not overlap. For the purposes of illustration and in a preferred embodiment, the subdivided areas are rectangle areas. Of course, subdivisions into areas of other shapes such as polygons and the like are possible and suitable for use within a system in accordance with the present invention.

Figure 3:
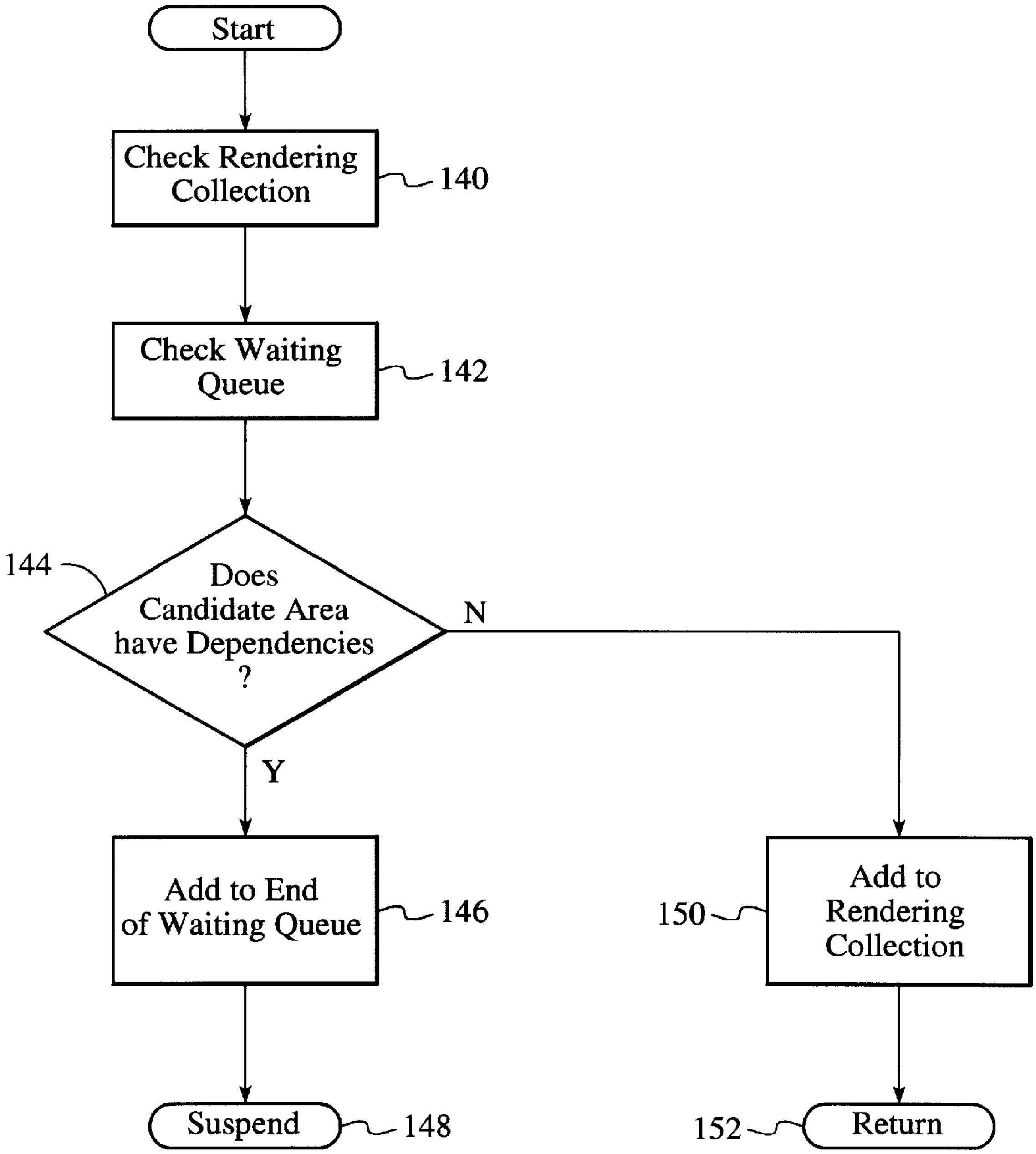
FIG. 3 presents a flow diagram of an arbitration process in accordance with the present invention.

Accordingly, FIG. 3 presents a flow diagram for arbitration in accordance with the present invention. The present invention, described with reference to FIG. 3 as well as FIGS. 4 and 5, can be a software program which can be suitably stored in system memory, such as ROM 106 (FIG. 1), or on other suitable computer readable media, such as a floppy disk. The process begins with a comparison between a candidate display area and display areas currently in a rendering collection and a waiting queue via steps 140 and 142. A candidate display area preferably refers to a process or program attempting to take control of a semaphore for display output in a display area of a display screen. For purposes of the following discussion, a display area refers to either an entire partition (e.g. window 132) or subdivision of the partition. Further, the rendering collection and waiting queue are suitably maintained in main memory 104 (FIG. 1), as is well appreciated by those skilled in the art. The rendering collection in one embodiment could be a running queue. In addition, in another embodiment, the rendering collection could be a graph or the like. The details of the checking steps 140 and 142 are presented in more detail with reference to FIG. 4.

Figure 4:
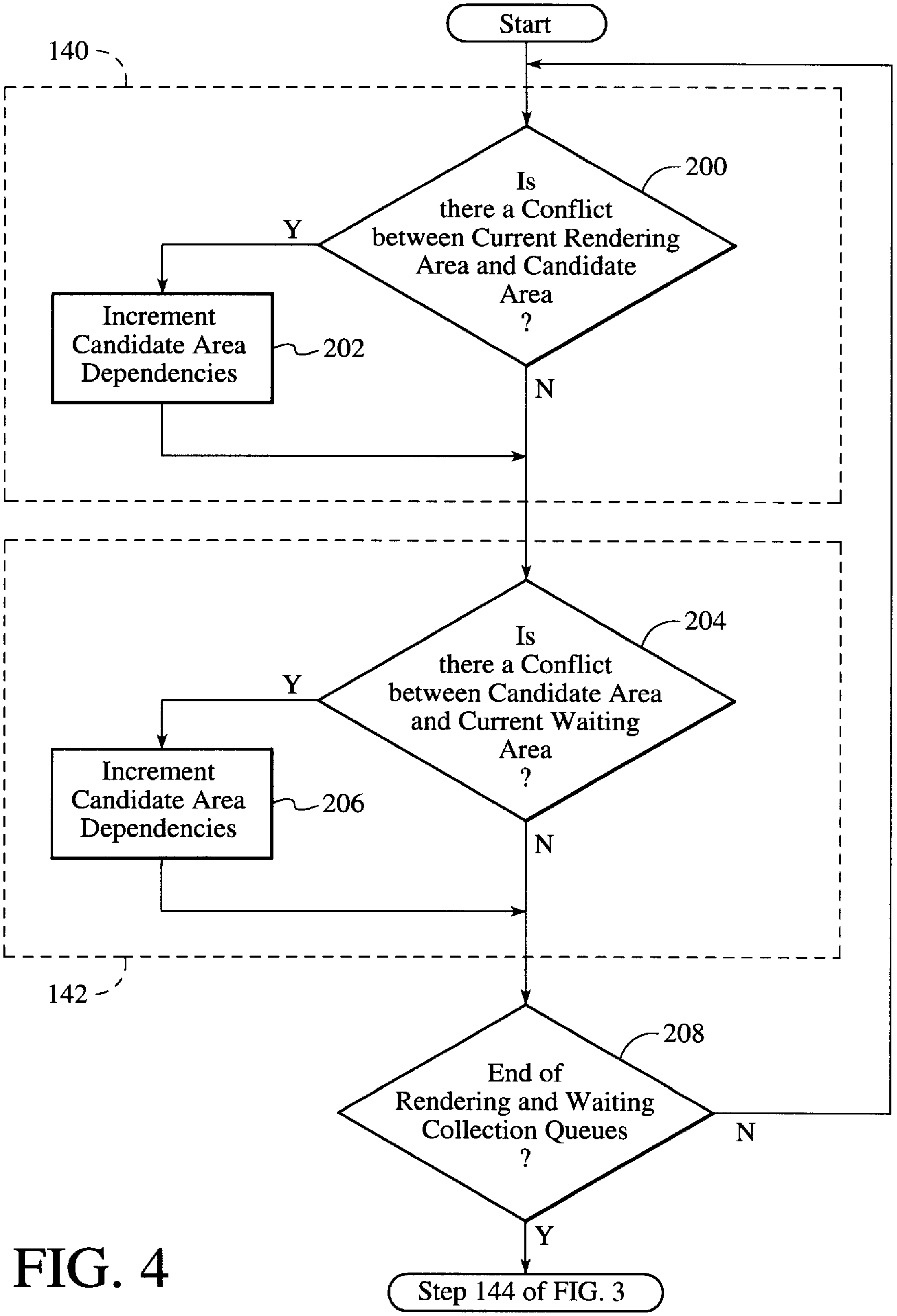
FIG. 4 presents a flow diagram for steps 140 and 142 of FIG. 3 in accordance with the present invention.

As shown in FIG. 4, the checking step 140 begins by determining whether a conflict exists between the candidate display area and a current rendering display area via step 200. For purposes of the present invention, conflicts indicate that the candidate display area is dependent on the completion of the display in an area that is currently occupied or that is already scheduled for control by another process. That is, the semaphore for the display area required by the candidate display area is owned or scheduled to be owned by another process. The identification of the conflicts is suitably achieved by comparing a "cookie" of the candidate display area with the "cookie" of the rendering and waiting display areas, where the "cookie" preferably identifies the comparison criteria. For example, in accordance with one aspect of the present invention, the cookie=acquire (windowID, rectangle) and thus the cookie includes identifiers for the window (e.g., "windowID") and area within the window (e.g., "rectangle") for the desired display area.

Thus, when step 200 determines that there is a conflict, i.e., the candidate display area's cookie conflicts with the current rendering display area's cookie, a dependency count for the candidate area is incremented via step 202. After completion of the incrementing step or when no dependencies exist between the candidate display area and the current rendering display area, the waiting queue check step 142 is initiated. In this step, another determination is made via step 204 for conflicts between the candidate display area and a current waiting display area in the waiting queue. When there is at least one conflict, the candidate dependency count is incremented by one via step 206. Upon completion of the incrementing or when no conflict exists, the process continues via step 208 to determine whether each rendering display area in the rendering collection and each waiting display area in the waiting queue has been compared with the candidate display area. When there are still comparisons to be made, the next waiting display area in the waiting queue and the next rendering display area in the rendering collection become the current waiting and current rendering display areas, respectively, and the process continues with step 200. Once all of the comparisons are completed, the process returns to step 144 in FIG. 3.

Referring again to FIG. 3, once the dependency comparisons between the candidate display area and the display areas in the waiting and rendering collections have been completed, a determination of whether dependencies exist for the candidate display area is made via step 144. If the dependency count is greater than zero and the candidate display area does have at least one dependency, the candidate display area is added to the waiting queue list (preferably at the end of the queue list) via step 146, and the process for the candidate display area is suspended via step 148. When the candidate display area is not dependent on any waiting or rendering display area, i.e., the dependency count is zero, the candidate display area is added to the rendering collection via step 150 and is allowed to proceed via step 152. Of course, the process would return to step 140 to repeat the processing steps with a next candidate display area.

With the steps illustrated by the flow diagram of FIG. 3 and expanded with the steps of the flow diagram of FIG. 4, a candidate display area, either as a subdivision of a partition or the entire partition itself, is appropriately compared with each display area currently stored in a rendering collection or waiting queue for the display. In this way, an efficient and straightforward manner of properly placing a candidate display area into a rendering or waiting queue is achieved, and possible conflicts among display areas are effectively monitored. As each currently rendering display area reaches completion, the partition or subdivision of a partition occupied by the currently rendering display area must be released for use by the next appropriate process for the display area. Accordingly, FIG. 5 illustrates a flow diagram of the steps in accordance with the present invention for performing the release.

Figure 5:
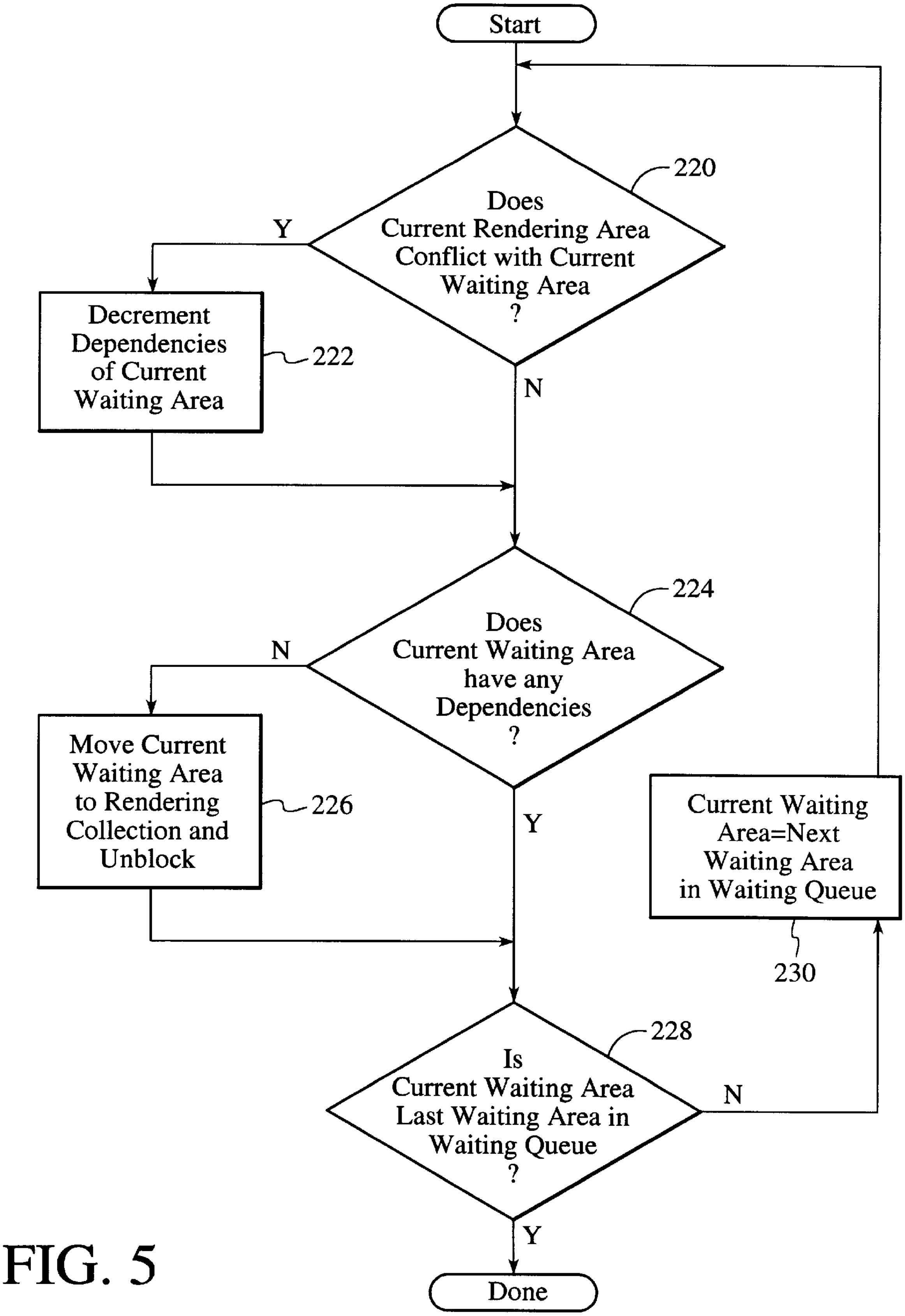
FIG. 5 presents a flow diagram of a release of a display area in accordance with the present invention.

As shown in FIG. 5, a determination of whether the current rendering display area conflicts with the current waiting display area, e.g., the first display area in the waiting queue, occurs via step 220. When a dependency does exist i.e., the waiting display area's cookie and the rendering display area's cookie are in conflict, the dependency count for the current waiting display area is decremented via step 222, since the conflict will no longer exist once the current rendering display area is finished. Upon the completion of the decrementing or when no dependency exists, a determination of whether the current waiting display area has any dependencies, i.e., has a dependency count still greater than zero, is made via step 224. When no dependencies exist, the current waiting display area is moved to the rendering collection via step 226. Of course, when there are dependencies, the current waiting display area remains in the waiting queue.

Upon completion of the comparisons between the current rendering display area and the current waiting display area, a determination of whether there are other display areas in the waiting queue is made via step 228. When the current waiting display area is not the last waiting display area in the waiting queue, the next waiting display area in the waiting queue becomes the current waiting display area via step 230, and the process returns to step 220. Otherwise, the steps of comparisons for releasing the display area is done.

With the present invention as illustrated in these flow diagrams, arbitration of control of display areas is readily achieved with low overhead and reduced latency in comparison with that of traditional client-server approaches. The present invention achieves these improvements by taking advantage of the window structure of most current display systems. As demonstrated, criteria for conflict is determined by the identifiers or terms of the cookie for each display area. Thus, the criteria used to determine dependency is alterable according to the needs or protocol of a particular system by easily altering the terms of the cookie. Such flexibility allows special processes, such as movies, i.e., series of display images output in quick succession, to be incorporated easily into the arbitration of the present invention. For example, the cookie terms could be modified to include an identifier that identifies the type of candidate display area as a movie. A type indicator of "movie" would preferably be used during the comparisons to indicate that there should be no conflicts, i.e., no possibility of suspended states, for the movie process. The movie would then suitably run within the display area properly without interruption.

Although the present invention has been described in accordance with the embodiments shown, one of ordinary skill in the art will recognize that there could be variations to the embodiment and those variations would be within the spirit and scope of the present invention. For example, although the present invention has been described as a control process stored in memory, control logic devices suitably designed to perform the arbitration functions as described herein are within the spirit and scope of the present invention. Further, although the present invention has been described in terms of performing checks on the rendering collection and the waiting queue in a particular order, these checks could suitably be performed in an alternate order, as well. Accordingly, many modifications may be made by one of ordinary skill without departing from the spirit and scope of the present invention, the scope of which is defined by the following claims.

We claim:

1. A method for arbitrating display output on a display device of a computer system, the method comprising:

(a) comparing a candidate display area with each of a plurality of rendering display areas and each waiting display area in a waiting queue, using only one variable for the number of dependencies for the candidate display area; and (b) determining whether at least one dependency exists for the candidate display area based on the comparing step, wherein the candidate display area is placed in the waiting queue when at least one dependency exists.

2. The method of claim 1 wherein the candidate display area is placed in a rendering collection when at least one dependency does not exist.

3. The method of claim 2 wherein the rendering collection comprises a running queve.

4. The method of claim 2 wherein the rendering collection comprises a graph.

5. The method of claim 1 wherein determining step (b) further comprises suspending the candidate display area when placed in the waiting queue.

6. The method of claim 1 wherein the determining step (b) further comprises:

(b1) determining whether a first conflict exists between a current rendering display area and the candidate display area;

(b2) incrementing a dependency count for the candidate display area when the first conflict exists;

(b3) determining whether a second conflict exists between a current waiting display area and the candidate display area; and (b4) incrementing the dependency count for the candidate display area when the second conflict exists.

7. The method of claim 6 further comprising repeating the determining and incrementing steps (b1)–(b4) for the candidate display area with each rendering display area in the rendering collection and each waiting display area in the waiting queue.

8. The method of claim 1 further comprising:

(c) releasing the current rendering display area.

9. The method of claim 8 wherein the releasing step (c) further comprises:

(c1) determining whether a conflict exists between the current rendering display area and the current waiting display area;

(c2) decrementing a dependency count for the current waiting display area when the conflict does exist; and (c3) determining whether the current waiting display area has a dependency count of zero, wherein when the dependency count is zero, the current waiting display area is added to the rendering collection.

10. The method of claim 9 wherein when the current waiting display area does not have a dependency count of zero, the current waiting display area remains in the waiting queue.

11. The method of claim 9 further comprising:

(d) determining whether the current waiting display area is a last waiting display area in the waiting queue, wherein when the current waiting display area is not the last waiting display area, the determining and decrementing steps (c1)–(c3) are repeated with a next waiting display area in the waiting queue.

12. The method of claim 1 wherein a display area is a rectangle area.

13. The method of claim 1 wherein a display area is a polygon area.

14. The method of claim 1 wherein a display area is an arbitrary region area.

15. The method of claim 1 wherein when the candidate display area is a movie, the movie has no dependencies.

16. A method for scheduling display of data on a computer display device, the method comprising:

(a) subdividing partitions of an output screen of the computer display device into display areas;

(b) determining whether at least one conflict exists between candidate display data, rendering display data in a rendering collection, and waiting display data in a waiting queue, using only one variable for the number of conflicts for the candidate display area; and (c) adding the candidate display data appropriately to either the rendering collection or the waiting queue based on at least one conflict existing.

17. The method of claim 16 wherein the display areas comprise rectangles.

18. The method of claim 16 wherein the determining step (b) further comprises:

(b1) determining whether a first conflict exists between current rendering display data and the candidate display data;

(b2) incrementing a dependency count for the candidate display data when the first conflict exists;

(b3) determining whether a second conflict exists between current waiting display data and the candidate display data; and (b4) incrementing the dependency count for the candidate display data when the second conflict exists.

19. The method of claim 16 wherein the adding step (c) further comprises:

(c1) adding the candidate display data to the waiting queue when the dependency count is greater than zero.

20. The method of claim 16 wherein the adding step (c) further comprises:

(c1) adding the candidate display data to the rendering collection when the dependency count is zero.

21. The method of claim 16 further comprising:

(d) releasing rendering display data.

22. The method of claim 21 wherein the step of releasing further comprises:

(d1) determining whether a conflict exists between current rendering display data and current waiting display data;

(d2) decrementing a dependency count for the current waiting display data when the conflict does exist; and (d3) determining whether the current waiting display data has a dependency count of zero, wherein when the dependency count is zero, the current waiting display data is added to the rendering collection.

23. The method of claim 22 wherein when the current waiting display data does not have a dependency count of zero, the current waiting display data remains in the waiting queue.

24. The method of claim 22 further comprising:

(e) determining whether the current waiting display data is a last waiting display data in the waiting queue, wherein when the current waiting display data is not the last waiting display data, the determining and decrementing steps (d1)–(d3) are repeated with a next waiting display data in the waiting queue.

25. The method of claim 16 wherein when the candidate display data is a movie, the candidate display data has no conflicts and is added to the rendering collection.

26. A computer readable medium containing program instructions for:

(a) comparing a candidate display area with each rendering display area in a rendering collection and each waiting display area in a waiting queue, using only one variable for the number of dependencies for the candidate display area; and (b) determining whether at least one dependency exists for the candidate display area based on the comparing step, wherein the candidate display area is placed in the waiting queue when at least one dependency exists.

27. The computer readable medium of claim 26 further comprising:

(c) releasing the current rendering display area.

28. The computer readable medium of claim 27 wherein the determining step (b) further comprises:

(b1) determining whether a first conflict exists between a current rendering display area and the candidate display area;

(b2) incrementing a dependency count for the candidate display area when the first conflict exists;

(b3) determining whether a second conflict exists between a current waiting display area and the candidate display area; and (b4) incrementing the dependency count for the candidate display area when the second conflict exists; and further wherein the releasing step (c) further comprises:

(c1) determining whether a conflict exists between the current rendering display area and the current waiting display area;

(c2) decrementing a dependency count for the current waiting display area when the conflict does exist; and (c3) determining whether the current waiting display area has a dependency count of zero, wherein when the dependency count is zero, the current waiting display area is added to the rendering collection.

29. The computer readable medium of claim 28 further comprising:

(b5) repeating the determining and incrementing steps (b1)–(b4) for the candidate display area with each rendering display area in the rendering collection and each waiting display area in the waiting queue; and (c4) determining whether the current waiting display area is a last waiting display area in the waiting queue, wherein when the current waiting display area is not the last waiting display area, the determining and decrementing steps (c1)–(c3) are repeated with a next waiting display area in the waiting queue.

* * * * *

UNITED STATES PATENT AND TRADEMARK OFFICE

CERTIFICATE OF CORRECTION

PATENT NO. : 5,825,359

DATED : October 20, 1998

INVENTOR(S) : Herbert G. Derby, et al.

It is certified that error appears in the above-identified patent and that said Letters Patent is hereby corrected as shown below:

In the claims:

Claim 3, Column 6, line 67, "queve" should read - -queue - -.

Signed and Sealed this

Thirtieth Day of March, 1999

Attest:

Q. TODD DICKINSON

*Attesting Officer* *Acting Commissioner of Patents and Trademarks*